(12) United States Patent
Xu et al.

(10) Patent No.: US 10,408,093 B2
(45) Date of Patent: Sep. 10, 2019

(54) WELDED HIGH-PRESSURE FUEL PUMP ROLLER TAPPET

(71) Applicant: Hangzhou XZB Tech Co.,Ltd, Hangzhou (CN)

(72) Inventors: Na Xu, Hangzhou (CN); Haijun Ren, Hangzhou (CN); Hua Dong, Hangzhou (CN)

(73) Assignee: Hangzhou XZB Tech Co., Ltd, Hangzhou (CN)

( * ) Notice: Subject to any disclaimer, the term of this patent is extended or adjusted under 35 U.S.C. 154(b) by 0 days.

(21) Appl. No.: 15/874,905

(22) Filed: Jan. 19, 2018

(65) Prior Publication Data

US 2019/0085731 A1 Mar. 21, 2019

(30) Foreign Application Priority Data

Sep. 20, 2017 (CN) .......................... 2017 1 0854500
Jan. 2, 2018 (CN) ..................... 2018 2 0002497 U (51) Int. Cl.
*F01L 1/14* (2006.01)
*F16H 53/06* (2006.01)
*F02M 59/10* (2006.01)
*F04B 1/04* (2006.01)

(52) U.S. Cl.
CPC ............. *F01L 1/14* (2013.01); *F02M 59/102* (2013.01); *F04B 1/0426* (2013.01); *F16H 53/06* (2013.01); *F01L 2105/00* (2013.01)

(58) Field of Classification Search
CPC .. F01L 1/14; F01L 1/143; F16H 53/06; F02M 59/102
See application file for complete search history.

(56) References Cited

U.S. PATENT DOCUMENTS

| | | | | |
|---|---|---|---|---|
| 5,307,769 | A * | 5/1994 | Meagher ................... | F01L 1/14 123/90.5 |
| 7,793,583 | B2 * | 9/2010 | Radinger ................ | F01L 1/143 74/569 |
| 8,235,018 | B2 * | 8/2012 | Dorn ......................... | F01L 1/14 123/90.48 |
| 9,482,118 | B2 * | 11/2016 | Dorn ..................... | F02M 59/102 |
| 9,541,184 | B2 * | 1/2017 | Champalou ............... | F01L 1/14 |

(Continued)

FOREIGN PATENT DOCUMENTS

| | | | | |
|---|---|---|---|---|
| DE | 102016205786 | A1 * | 10/2017 | ............ F04B 1/0408 |
| JP | 2017210950 | A * | 11/2017 | ........... F02M 59/102 |

*Primary Examiner* — Adam D Rogers
(74) *Attorney, Agent, or Firm* — Gokalp Bayramoglu (57) ABSTRACT

A welded high-pressure fuel pump roller tappet, which is used for the fuel injection system in an engine, includes a guide sleeve, a U-shaped holder and a pin-shaft-roller set. Symmetrical positions on the upper portion of left and right sidewalls of the guide sleeve are provided with inflexed flanges. Two sides of the flange are folded inwardly to form a limiting slot. The U-shaped holder includes a bottom plate and side plates located on left and right sides of the bottom plate. Symmetrical positions on two side plates are provided with axle holes. The pin-shaft-roller set is set up between two side plates of the U-shaped holder. Symmetrical positions on the upper portion of the flange are provided with opening slots. After assembly, the U-shaped holder is located between two flanges. Two side plates are located inside the limiting slots in the flanges.

6 Claims, 6 Drawing Sheets

(56) References Cited

U.S. PATENT DOCUMENTS

| | | | |
|---|---|---|---|
| 9,772,022 B2 * | 9/2017 | Berruet | F02M 37/06 |
| 9,803,515 B2 * | 10/2017 | Oka | F01L 1/14 |
| 9,850,785 B2 * | 12/2017 | Berruet | F02M 59/102 |
| 9,863,382 B2 * | 1/2018 | Xu | F02M 59/102 |
| 9,885,330 B1 * | 2/2018 | Xu | F02M 59/102 |
| 9,982,767 B2 * | 5/2018 | Schick | F01L 1/14 |

\* cited by examiner

WELDED HIGH-PRESSURE FUEL PUMP ROLLER TAPPET

CROSS REFERENCE TO RELATED APPLICATIONS

This application is based upon and claims priority to Chinese Patent Application No. 201710854500.5, filed on Sep. 20, 2017, and Chinese Patent Application No. 201820002497.4, filed on Jan. 2, 2018, the entire contents of which are incorporated herein by reference.

TECHNICAL FIELD

The present invention relates to the technical field of engine apparatuses, particularly to a welded high-pressure fuel pump roller tappet.

BACKGROUND

The roller tappet is an important part of the automobile engines using high-pressure fuel pump system, and is mounted between the driving cam and the tappet to transform the rotational motion of the driving cam into the linear reciprocating motion of the tappet. The main structure of the roller tappet includes a shell, a holder, a roller and a pin.

Currently, the height and the mass of the high-pressure fuel pump roller tappet, available in the market, are both large, and the moving inertial force is huge. Hence, an interference with the structure inside the engine occurs easily, increasing the friction and the wear & tear, reducing the efficiency of the engine. Therefore, the high-pressure fuel pump roller tappet does not comply with the requirements of lightweight engines. Moreover, the connecting manner between the shell and the holder is monotonous. Usually, extruding deformation or a connection through pin is used. During rapid movement, the overall stiffness of the high-pressure fuel pump tappet is poor.

SUMMARY

In order to solve the technical problem in the prior art, the present invention provides a welded high-pressure fuel pump roller tappet, which has advantages of smaller overall height, lower mass, simple and easy installation, high structural stiffness, and is less likely to interfere with the structure inside the engine.

To achieve the above purposes, technical solutions used by the present invention are as follows:

A welded high-pressure fuel pump roller tappet, which is used for the fuel injection system in an engine and is mounted between a driving cam and a fuel pump plunger of the engine cylinder head. The welded high-pressure fuel pump roller tappet includes a guide sleeve, a U-shaped holder, and a pin-shaft-roller set. The guide sleeve has a cylindrical structure formed integrally, having the function of guiding direction in a complete circle, and having a nice guidance quality. Symmetrical positions on left and right sidewalls of the upper portion of the guide sleeve are provided with inflexed flanges. Two sides of the flange are folded inwardly to form a limiting slot. The U-shaped holder is formed integrally, including a bottom plate and side plates located on left and right sides of the bottom plate. Symmetrical positions on the two side plates are provided with axle holes. The pin-shaft-roller set includes a pin shaft, a roller, and roller pin. The roller pin is located between the pin shaft and the roller. The pin-shaft-roller set is set up between two side plates of the U-shaped holder. Symmetrical positions on the upper portion of the flange are provided with opening slots. After assembly, two ends of the pin shaft are located inside the opening slots of the flange. The U-shaped holder is located between two flanges. Two side plates are located inside limiting slots of the flange, having the function of positioning, such that the rotation of the U-shaped holder with respect to the guide sleeve is effectively prevented. Moreover, the guide sleeve and the U-shaped holder are connected by welding, ensuring the stiffness of the guide sleeve, such that the height of the guide sleeve can be reduced greatly, and the overall weight of the high-pressure fuel pump roller tappet can be reduced. Moreover, the interference between the guide sleeve and the engine can be prevented.

Preferably, the opening slot is an arc-shaped opening slot, which has a shape of more than a semicircle, equal to a semicircle, or less than a semicircle.

Preferably, the opening slot is a U-shaped opening slot. The installation is simple and easy. The installation process is simplified.

Preferably, one side of front and rear sidewalls of the guide sleeve is provided with a window. The window is provided with a limiting block, which partially protrudes out of the external sidewall of the guide sleeve. The combination of the window and the positioning piece has two functions. One is to limit the rotation of the U-shaped holder in the guide sleeve. The other is to play the role of positioning and rotation-blocking of the entire roller tappet. During the overall assembly, the protruded portion of the positioning piece is mounted inside the positioning slot of the fuel pump cylinder, preventing the roller tappet from rotating in the cylinder.

Preferably, a position of the external sidewall of the side plate which has the same height as that of the guide sleeve provided with a chamfer as a yielding region, which can prevent the sidewall of the U-shaped holder from interfering with other parts inside the engine. Moreover, the weight of the U-shaped holder is reduced.

Preferably, end faces of front and rear sides of the bottom plate have a transition curve with an equal strength design. The shape of the transition curve is an arch or other curves, which can avoid stress concentration, enhancing the fatigue strength of the structure of the U-shaped holder. Moreover, the structural weight of the U-shaped holder is significantly reduced, achieving the lightweight.

Preferably, upper and lower ends of the guide sleeve still remain cylindrical structure, such that both ends have the function of guiding direction in a complete circle, having a nice guidance.

Preferably, the bottom surface of the bottom plate of the U-shaped holder can be a planar structure or a curved structure.

Preferably, the bottom surface of the bottom plate is provided with a convex platform protruding downward. The surface of the convex platform can be a planar structure or a curved structure.

The above several types of surface structures are all used as the working surface contacting the fuel pump plunger. The working surface can be the bottom surface of the bottom plate, and can also be on the convex platform or the concave platform. The convex platform and the concave platform can be formed by stamping. Moreover, the surface of several types of working surfaces can be a plane or a curved surface. Such configurations are all used to achieve a better transmission function, meeting corresponding working demand.

Advantages of the present invention are as follows. 1. The structure of the opening slot makes the height of the guide sleeve short, such that the overall mass can be effectively controlled. The moving inertial force can be reduced. The interference between the overall structure and the structure inside the engine can be prevented. The friction and wear & tear can be reduced. The efficiency of the engine can be improved.

2. The outer contour is the guide sleeve. The overall height has the function of direction-oriented. The function of direction-oriented can be performed within the overall height, making it more stable during working.

3. The U-shaped holder and the guide sleeve are connected by welding, significantly improving the stiffness of the window position on the sidewall of the guide sleeve, such that a high pressure can be withstood, and a harsh environment can be adapted.

4. The pin shaft uses an open type of installation manner, without using pressing rivet or screwing rivet manner, etc. The pin shaft is generally in a free rotation state. The installation is simple and easy. The installation process is simplified, such that the assembly rhythm can be effectively improved.

5. Based on the rigid connection between the bottom of the U-shaped holder and guide sleeve, the guide sleeve moves up and down together with the U-shaped holder, ensuring the mechanical property of the whole set, reducing the noise and the wear & tear.

6. With the installation-fitting relationship between the flange of the guide sleeve and the side plate of the U-shaped holder, no apparent swing clearance occurs during the movement of the U-shaped holder and the guide sleeve, making the movement more stable.

In the drawings: 1, guide sleeve; 1.1, flange; 1.11, limiting slot; 1.2, arc-shaped opening slot; 1.3, U-shaped opening slot; 2, U-shaped holder; 2.1, bottom plate; 2.2, side plate; 2.3, axle hole; 2.4, chamfer; 2.5, end face; 3, pin-shaft-roller set; 3.1, pin shaft; 3.2, roller; 3.3, roller pin; 4, limiting block.

DETAILED DESCRIPTION OF THE INVENTION

The present invention is further described through embodiments and drawings hereinafter.

The first embodiment: as shown in FIG. 1-4, a welded high-pressure fuel pump roller tappet, which is used for the fuel injection system in an engine, includes guide sleeve 1, U-shaped holder 2, and pin-shaft-roller set 3. Symmetrical positions on left and right sidewalls of the upper portion of guide sleeve 1 are provided with inflexed flanges 1.1. Two sides of flange 1.1 are folded inwardly to form a limiting slot 1.11. Symmetrical positions on the upper portion of flange 1.1 are provided with arc-shaped opening slots 1.2, which have a shape of more than a semicircle, equal to a semicircle, or less than a semicircle. One side of the front and rear sidewalls of guide sleeve 1 is provided with a window. The window is provided with positioning piece 4. The positioning piece 4 partially protrudes out of external sidewall of guide sleeve 1.

U-shaped holder 2 includes bottom plate 2.1 and side plates 2.2. The side plates are located on left and right sides of bottom plate 2.1. Symmetrical positions on two side plates 2.2 are provided with axle holes 2.3. End faces 2.5 of front and rear sides of bottom plate 2.1 are the transition curves with an equal strength design. The shape of the curve may have different variations, so as to achieve a reasonable transition of the stress. Pin-shaft-roller set 3 includes pin shaft 3.1, roller 3.2, and roller pin 3.3. Roller pin 3.3 is located between pin shaft 3.1 and roller 3.2.

After assembly, pin-shaft-roller set 3 is set up between two side plates 2.2 of U-shaped holder 2. U-shaped holder 2 is located between two flanges 1.1. Two side plates 2.2 are located inside the limiting slot 1.11 in flange 1.1. Two ends of pin shaft 3.1 are located inside the opening slot in flange 1.1. Moreover, a position on the external sidewall of side plate 2.2 which has the same height as that of guide sleeve 1 is provided with chamfer 2.4. Guide sleeve 1 and U-shaped holder 2 are connected by welding.

In the present embodiment, arc-shaped opening slot 1.2 and the welding connection effectively ensure the connection stiffness between guide sleeve 1 and U-shaped holder 2. Moreover, the height of guide sleeve 1 is designed to be short. The mass of the overall structure is small, and the assembly is flexible.

Figure 1:
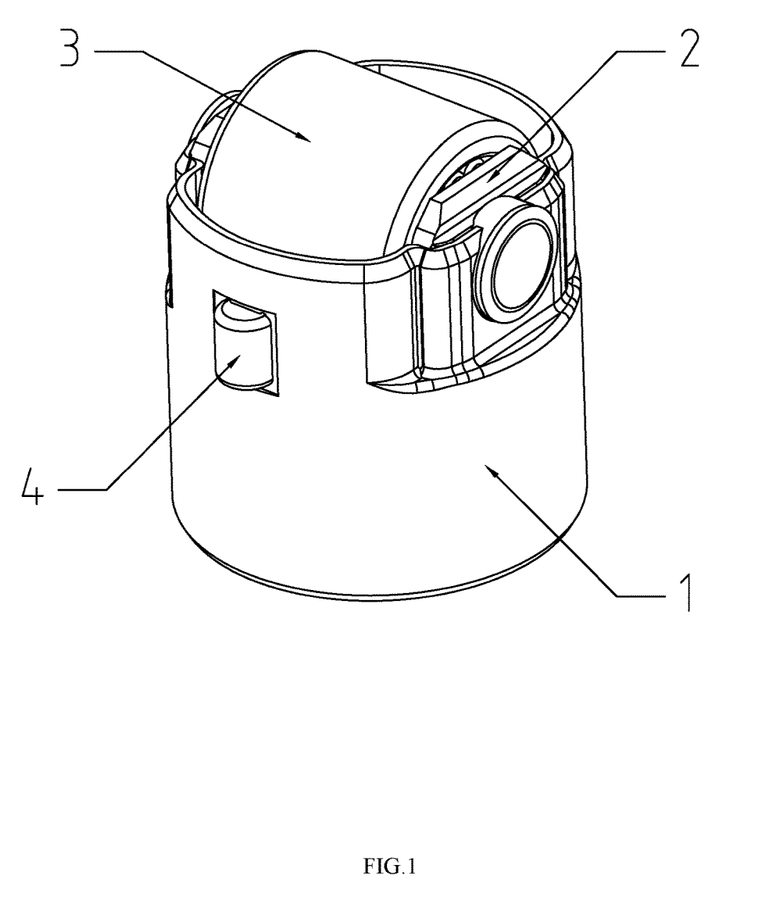
FIG. 1 is the structural schematic diagram of the first embodiment of the present invention.
Figure 2:
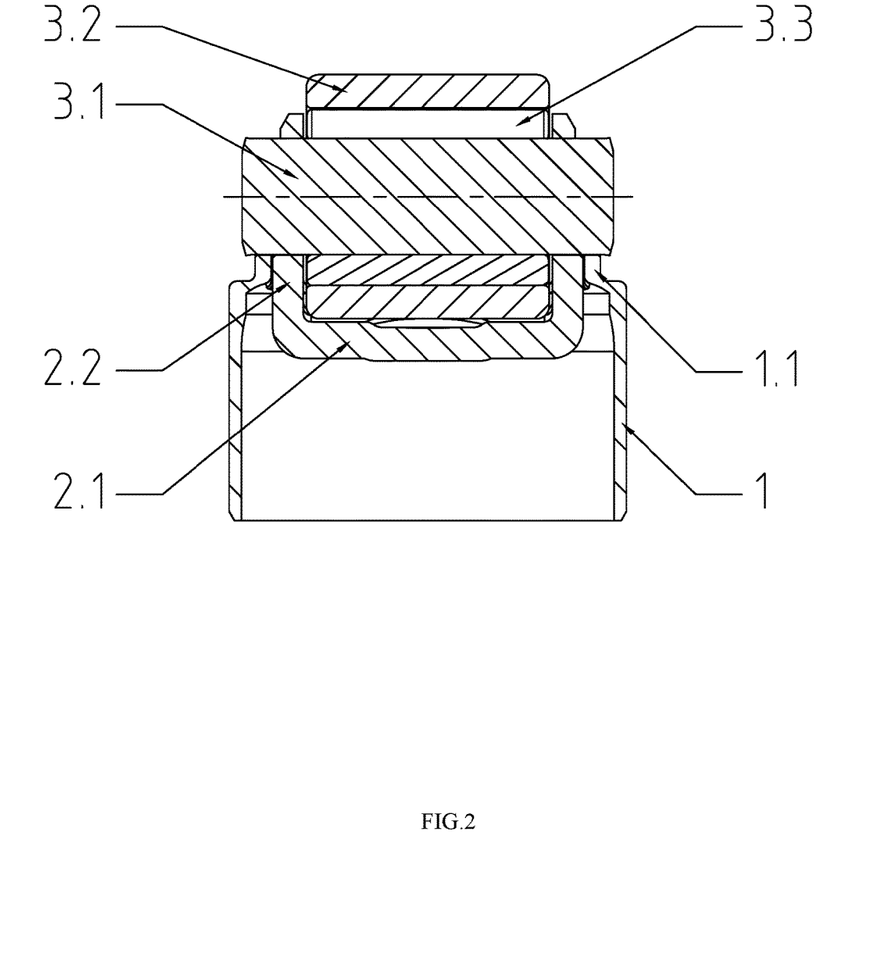
FIG. 2 is the sectional view of FIG. 1.
Figure 3:
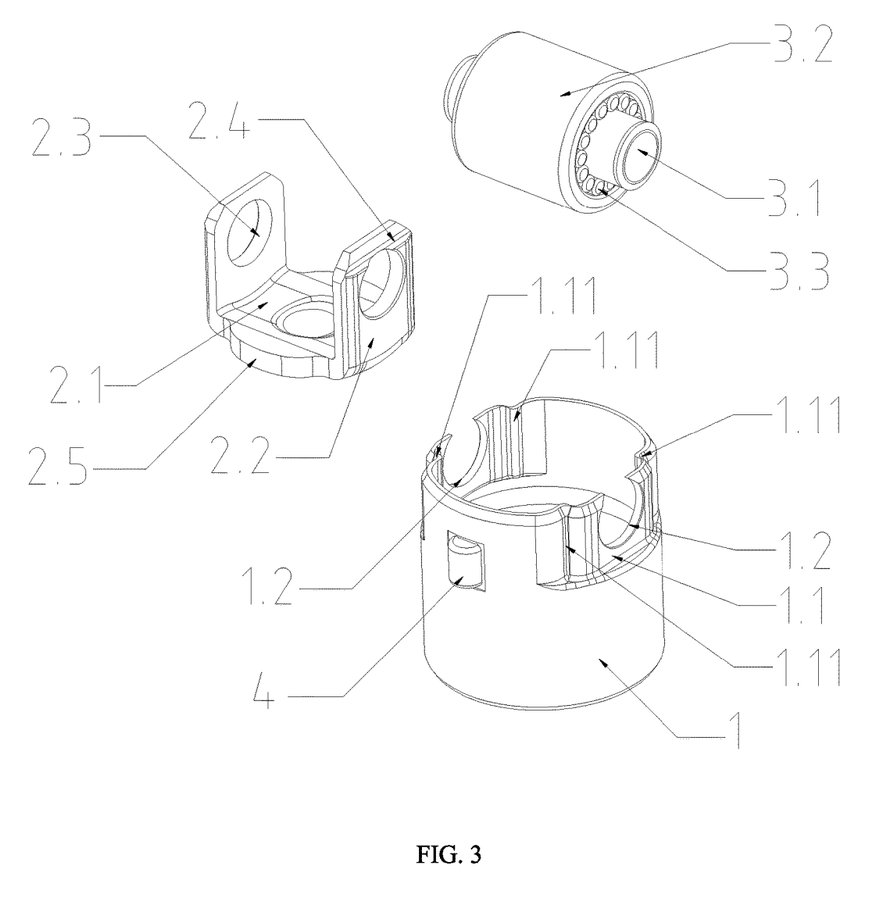
FIG. 3 is the exploded view of FIG. 1.
Figure 4:
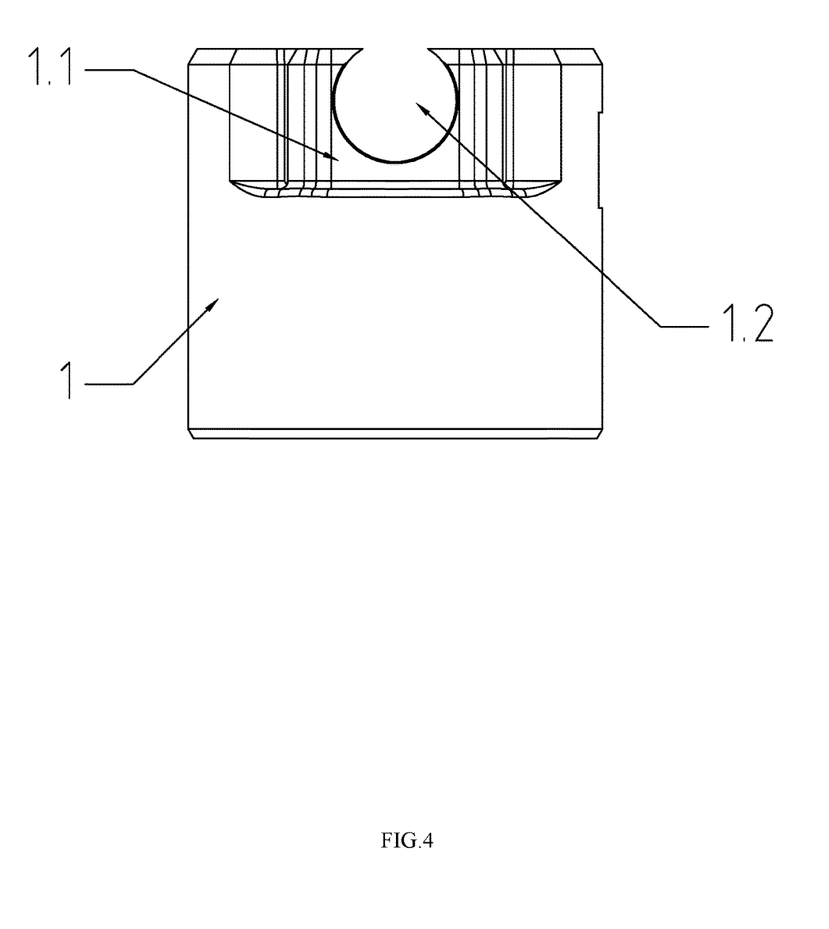
FIG. 4 is the main view of the guide sleeve in the first embodiment of the present invention.
Figure 5:
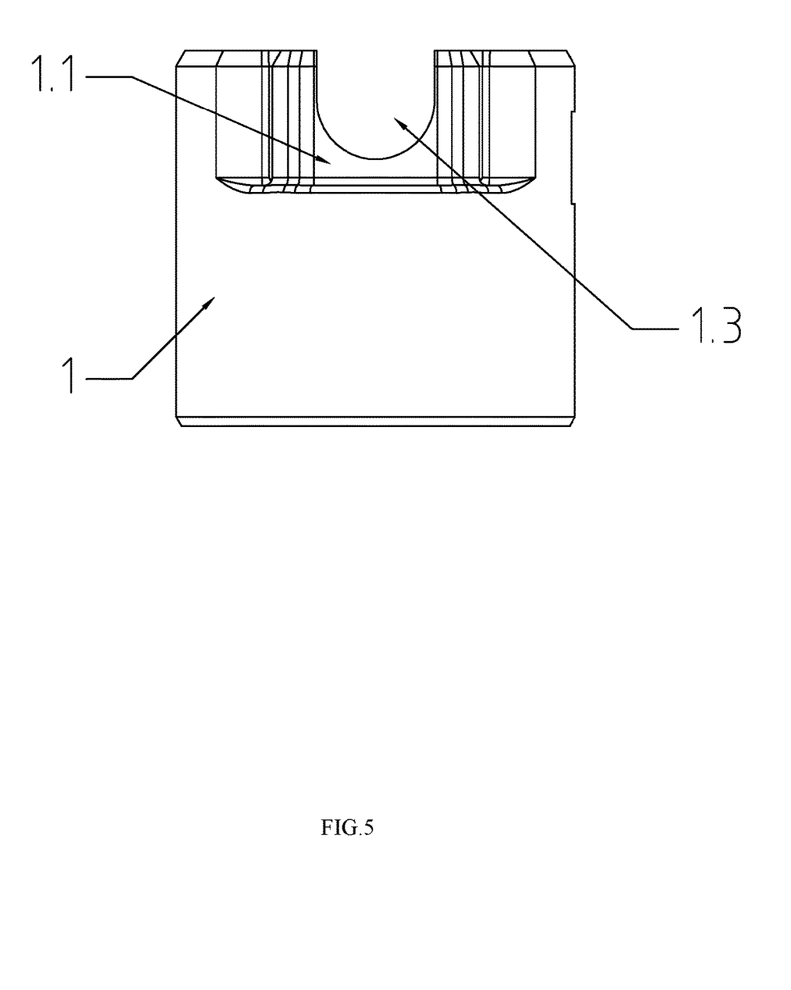
FIG. 5 is the main view of the guide sleeve in the second embodiment of the present invention.
Figure 6:
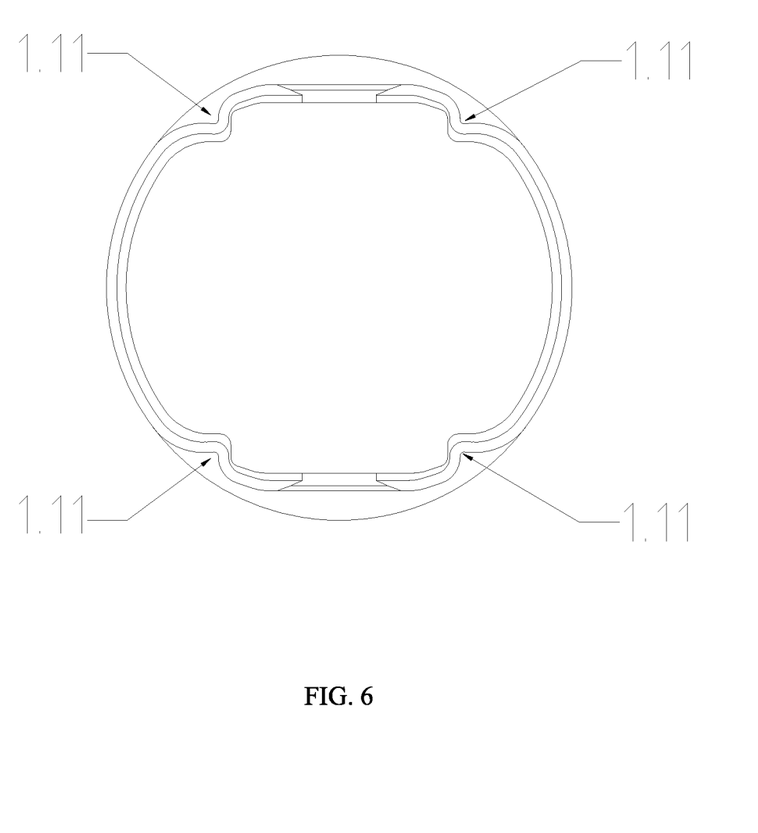
FIG. 6 is the top view of the first and second inflexed flanges having z-shape configuration form.

The second embodiment: as shown in FIG. 5, compared to the first embodiment, the difference is that the opening slot of the guide sleeve shown in the second embodiment is U-shaped opening slot 1.3. The installation is simple and easy. The installation process is simplified, such that the assembly rhythm can be effectively improved.

The above are only the embodiments of the invention, but the structural features of the invention are not limited thereto. The invention can be used in similar products. Any change or modification made by a person with ordinary skill in this art that falls within the scope of the invention, are covered by the patent scope of the invention.

What is claimed is:
1. A welded high-pressure fuel pump roller tappet configured for a fuel injection system in an engine, comprising:
a guide sleeve,
a U-shaped holder, and
a pin-shaft-roller set;
wherein
the guide sleeve comprises a first inflexed flange and a second inflexed flange, the first inflexed flange is disposed on a left sidewall of an upper portion of the guide sleeve, and the second inflexed flange is disposed on a right sidewall of the upper portion of the guide sleeve, the first inflexed flange and the second inflexed flange are disposed on symmetrical positions; two sides of the first inflexed flange are folded inwardly to form a first limiting slot; two sides of the second inflexed flange are folded inwardly to form a second limiting slot;
the U-shaped holder comprises a bottom plate, a left side plate and a right side plate, the left side plate and the right side plate are respectively located on a left side of the bottom plate and a right side of the bottom plate, a first axle hole is provided on the right side plate and a second axle hole is provided on the left side plate, the first axle hole and the second axle hole are provided on symmetrical positions;

the pin-shaft-roller set comprises a pin shaft with two ends, a roller, and a roller pin, the roller pin is located between the pin shaft and the roller;

the pin-shaft-roller set is set up between the right side plate and the left side plate of the U-shaped holder;

the first inflexed flange comprises a first opening slot and the second inflexed flange comprises a second opening slot, the first opening slot and the second opening slot are provided on symmetrical positions on an upper portion of the first inflexed flange and an upper portion of the second inflexed flange, the two ends of the pin shaft are located inside the first opening slot and the second opening slot respectively, the U-shaped holder is located between the first inflexed flange and the second inflexed flange, the guide sleeve and the U-shaped holder are connected by welding, the left side plate is located inside the first limiting slot and the right side plate is located inside the second limiting slot, and the first and second limiting slots are vertically formed in a surface of the first and second inflexed flanges, respectively, and wherein, when viewed from a top view, the first inflexed flange has a substantially z-shaped configuration formed by the first limiting slot and the first inflexed flange and the second inflexed flange has a substantially z-shaped configuration formed by the second limiting slot and the second inflexed flange.

2. The welded high-pressure fuel pump roller tappet according to claim 1, wherein the first opening slot or the second opening slot is an arc-shaped opening slot, and the arc-shaped opening slot has a shape of more than a semicircle, equal to the semicircle, or less than the semicircle.

3. The welded high-pressure fuel pump roller tappet according to claim 1, wherein the first opening slot or the second opening slot is a U-shaped opening slot.

4. The welded high-pressure fuel pump roller tappet according to claim 1, wherein the guide sleeve comprises a front sidewall and a rear sidewall, one side of the front sidewall and the rear sidewall of the guide sleeve is provided with a window, the window comprises a positioning piece, and the positioning piece partially protrudes out of the side of the front sidewall and the rear sidewall of the guide sleeve.

5. The welded high-pressure fuel pump roller tappet according to claim 1, wherein an external sidewall of the left side plate is provided with a first chamfer; and an external sidewall of the right side plate is provided with a second chamfer.

6. The welded high-pressure fuel pump roller tappet according to claim 1, wherein the bottom plate comprises a front side and a rear side, the front side has a front end face and the rear side has a rear end face, each of the front end face and the rear end face has a shape of an arch.

* * * * *